United States Patent [19]

Chang

[11] 4,011,511
[45] Mar. 8, 1977

[54] FREQUENCY-SHIFT DIGITAL DATA LINK AND DIGITAL FREQUENCY DETECTION SYSTEM

[75] Inventor: Robert Wu-Lin Chang, Huntington, N.Y.

[73] Assignee: The Singer Company, Binghamton, N.Y.

[22] Filed: Feb. 13, 1976

[21] Appl. No.: 657,785

Related U.S. Application Data

[63] Continuation of Ser. No. 491,272, July 24, 1974, abandoned.

[52] U.S. Cl. .................................. 325/40; 325/56; 325/59; 178/69.1; 179/15 BS
[51] Int. Cl.² ...................... H04J 1/00; H04L 7/00; H04L 27/10
[58] Field of Search ................... 178/66 R, 69.5 R; 325/30, 163, 320, 40, 56, 59; 329/104; 179/15 BS, 15 FD

[56] References Cited

UNITED STATES PATENTS

| | | | |
|---|---|---|---|
| 2,899,548 | 8/1959 | Boughtwood et al. | 325/59 |
| 3,622,885 | 11/1971 | Kruszynski et al. | 325/59 X |
| 3,846,708 | 11/1974 | Franco | 329/104 |

*Primary Examiner*—Robert L. Richardson
*Attorney, Agent, or Firm*—James F. Duffy; James C. Kesterson

[57] ABSTRACT

In a digital data link system which transmits and receives frequency-shift keyed digital data over mark/space frequency channels, the invention enhances system performance in the presence of noise. The method utilizes two synchronization channels, selecting the better one to synchronize the receiver to the transmitter. The method teaches the accumulation of the results of a plurality of data-state determining measurements and the utilization of the accumulated measurements made during a baud interval to resolve the received mark/space frequency signal into a corresponding mark/space data-state signal. Apparatus to practice the method is described. The apparatus includes a timing recovery circuit for synchronization-channel selection and a digital frequency detector capable of extracting information from a data signal in the presence of noise having the same frequency as the data signal and up to 86.6% of the amplitude of the data signal.

15 Claims, 9 Drawing Figures

FREQUENCY-SHIFT DIGITAL DATA LINK AND DIGITAL FREQUENCY DETECTION SYSTEM

This is a continuation of application Ser. No. 491,272, filed July 24, 1974, now abandoned.

BACKGROUND OF THE INVENTION

1. Field of the Invention

This invention relates generally to frequency-shift keyed data link systems and particularly to method and apparatus for synchronizing said systems and recovering information transmitted when such a system is operated in an interference prone environment.

2. Prior Art

Digital transmission of information makes efficient use of transmission facilities since more information may be packed into a given transmission period than may be done with voice or other analog communication schemes. Digital transmission is in the form of pulses organized in a manner to convey information.

If only one message is to be transmitted across a message carrying medium there is no doubt that the pulses received relate to the message transmitted. However, if two or more messages are to be sent across the same medium simultaneously, some means of identifying a given pulse with a given message must be provided if communication, in the true sense of the word, is to occur. For this reason pulses are often identified with a given message by pulse code modulation (PCM) techniques. Frequency-shift keying (FSK) is one form of PCM.

With FSK, a given message is assigned a corresponding frequency channel to carry the information across the message medium. The message medium may be air, water, wire lines, electromagnetic fields, etc. Within the frequency channel, a pair of frequencies may be assigned; one to indicate the presence of a MARK, the other the presence of a SPACE. The mark/space terminology derives from the early days of telegraphy where the MARK indicated the telegraph key was closed and current flowed.

Information is derived from a particular coded grouping of marks and spaces referred to as a "frame". When a series of marks and spaces are transmitted, it is important that the receiver be able to identify a particular mark or space as belonging to a given encoded group or frame. If the identification process fails, gibberish may result at the receiver output and the receiver is said to be out of synchronization with the transmitter.

Similar nonsensical results may derive if a given MARK or SPACE is obliterated by interference or if the interference causes a MARK or SPACE signal to appear on the receiver line where no or the opposite sense signal was transmitted.

Synchronization and interference become more difficult problems as size of the data link system increases. As signals are transmitted over longer distances across varied media their time scale tends to differ and they become more sensitive to interference.

Prior art synchronization techniques fall into two categories:

The fully synchronous approach where an attempt is made to synchronize and drift-compensate all the clocks used throughout the system. This means all clocks must display the same operating speeds;

The quasi-synchronous approach accepts a close but imperfect clock correlation which means the message will be distorted. To overcome the effects of such distortion, pulse stuffing techniques may be resorted to: Dummy characters are added to the transmission and the distortion is confined to these dummies so far as is possible.

Some systems make use of synchronizing pulses added to each encoded information frame. When additional channels are added to the system it is advantageous to add synchronizing pulses to synchronize each channel rather than trying to synchronize groups of channels. As the information content, speed of data transmission, and number of channels increase, the need for such additional synchronizing pulses places an added burden on the system.

It is an object of the present invention to provide method and apparatus for synchronizing a data link system without the need for correlating multiple system clocks or for providing additional synchronization pulses within each information frame (group) or within each channel.

Interference can destroy transmitted synchronization signals as well as gobble the information content of a message.

It is a further object of the invention to provide method and apparatus to enhance system ability to remain synchronized in the presence of interference.

It is the inventor's intention to also supply method and apparatus for determining the data state (i.e., MARK or SPACE) of the signal transmitted even though the received signal has been degraded by interference signals approaching the received signal in amplitude and frequency. To this end a digital frequency detector is disclosed which functions to demodulate and recover the digital data from the received mark/space signals, even in the presence of an interfering signal of the same frequency, and at an amplitude approaching that of, the true signal.

SUMMARY OF THE INVENTION

In a frequency-shift digital data link system, operating over a plurality of different mark/space frequency channels, in an interference prone environment, signal integrity is maintained by synchronizing the transmitter and receiver using two or more channels to transmit synchronization signals and selecting the best received signal as a clock signal for the receiver. In the embodiment of the invention disclosed the "best" synchronization signal is that which shows least phase jitter.

Signal integrity is further enhanced by a digital frequency detector which accumulates the results of a plurality of data-state-determining measurements made during a baud interval, and resolves the received signal into its corresponding data state as a result of the accumulated measurement. To do so, the output of a high frequency clock is measured. The number of counts occurring during periodic cycles of the received mark/space frequency signal is accumulated over a baud interval. The accumulated count is compared to a reference count which is that count which would have accumulated during the same measuring interval had the received mark/space frequency signal a period equal to, for example, the average period of a MARK and a SPACE frequency signal. If the actual count accumulated exceeds that of the reference count the received signal may be designated a MARK; if less than the reference count, the received signal may be designated a SPACE.

DESCRIPTION OF THE INVENTION

Additional Background Information

The invention is aimed at assuring the integrity of communication in a frequency-shift keyed digital data link even under severe noise conditions. Noise is defined in communication theory as any signal that interferes with the message being sent and is an undesired disturbance in any communication system. Conventional prior art techniques such as frequency modulation, limiting, and filtering aid in reducing noise degradation of the system. Sophisticated coding techniques often aid in recovering data that has been literally wiped out by noise. The invention will be described to disclose its application in both the more conventional as well as the more sophisticated coded systems.

The reader interested in learning more of the background art is referred to the following texts:

Murphy and Kallis, "introduction to data communication", Digital Equipment Corp., Maynard, Mass., 1971.

Martin, "Telecommunications and the Computer", Prentice-Hall Inc., Englewood Cliffs, N.J., 1969.

Martin, "Furture Developments in Telecommunications", Prentice-Hall Inc., Englewood Cliffs, N.J., 1971.

Peatman, "The Design of Digital Systems, Mc Graw-Hill Book Co., N.Y.C., 1972.

Taub and Schilling, "Principles of Communication Systems, Mc Graw-Hill Book Co., N.Y.C., 1971.

Peterson and Weldon, "Error Correcting Codes", 2nd Ed., The MIT Press, Cambridge, Mass., 1972.

Figure 1:
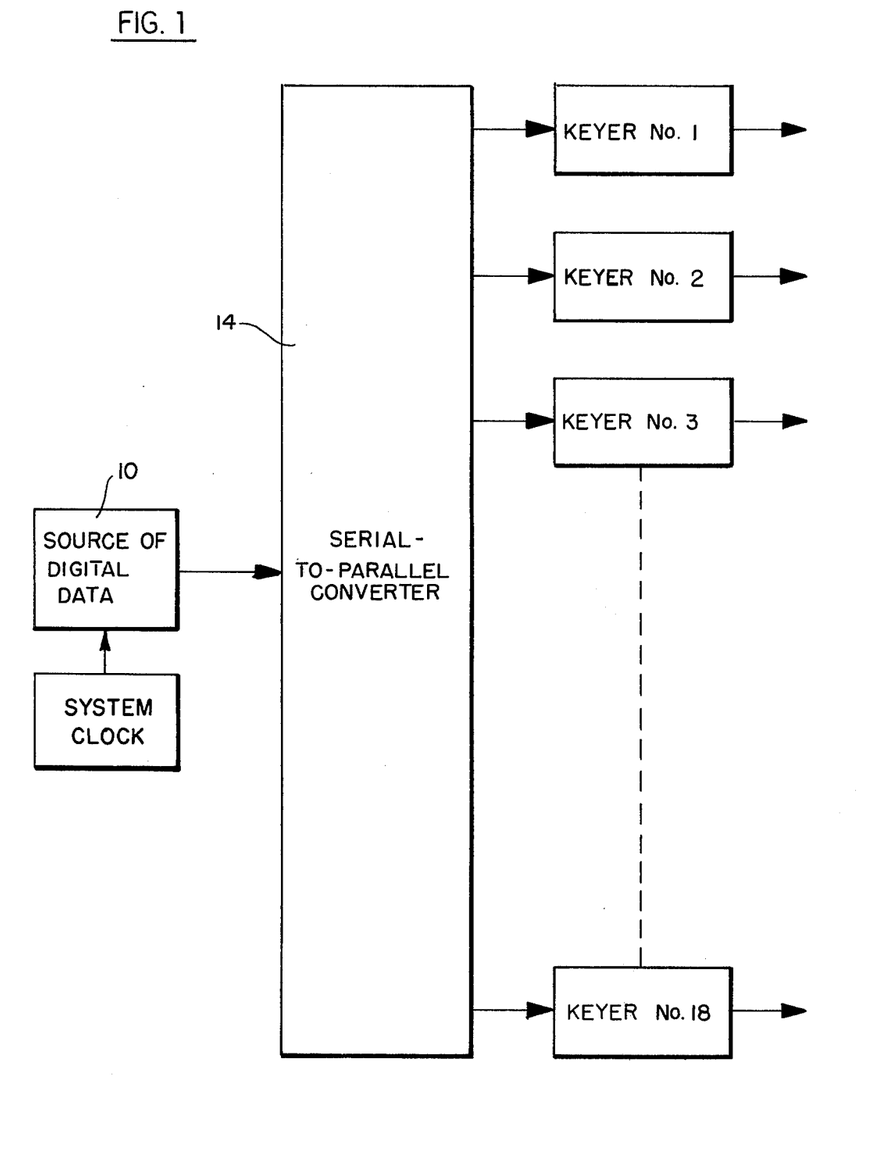
FIG. 1 is a block diagram of a digital data transmitter operating in a mode which does not provide an error correcting field in the transmitted data frame.

FIG. 1 shows the transmitter end of a data link. A source 10 of digital data provides a serial stream of information to a serial-to-parallel converter. A group of keyers, for example, eighteen in number, accepts the paralleled data and passes it at a frequency determined by the information content of the data. Each keyer provides one channel of frequency-shift keyed (FSK) data. The FSK channels are then combined and transmitted to a receiver in the data link system. (Combiner and transmitter are not shown in FIG. 1). A system clock is provided to synchronize the system.

Figure 2:
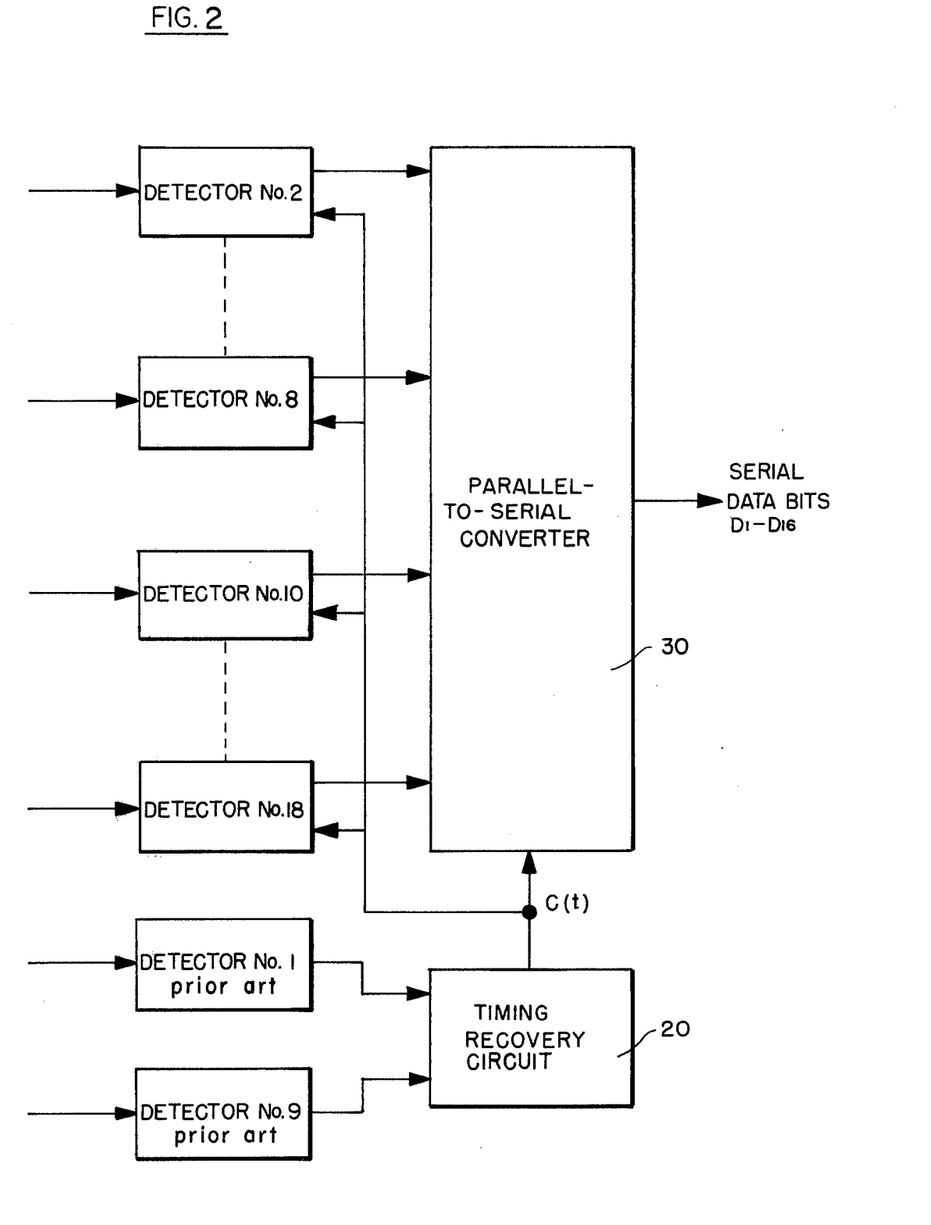
FIG. 2 is a block diagram of a digital data receiver operating to receive data from the transmitter of FIG. 1.

At the receiver, part of which is shown in FIG. 2, each channel of FSK data is detected and converted back by parallel to serial converter 30 to the serial data stream which originated at the transmitter data source 10. A timing recovery circuit 20 is employed to keep the receiver in synchronization with the transmitter. As shown, FSK synchronization data are transmitted on two channels to be detected at the receiver at detectors No. 1 and No. 9.

Processing the data from two synchronization-channels in timing recovery circuit 20 provides a means of synchronizing the operation of both transmitter and receiver without the need of having to correlate station clocks at each location, and yields enhanced performance in the presence of noise. The timing recovery circuit will be discussed in greater detail later.

Also to be discussed more fully later are the digital frequency detectors Nos. 2–8, 10–18 which, as will be disclosed, greatly reduce the degrading effects of noise on the system.

The data link of FIGS. 1 and 2 has its more conventional signal-handling-in-the-presence-of-noise capabilities improved by use of the synchronizing scheme and digital frequency detectors disclosed herein.

Table 1 shows a typical frequency allocation for the channels and the mark/space frequency signals which might be employed with the data link of FIGS. 1 and 2. In the example given, channels 1 and 9 are used for synchronization signals, while information data are carried on the remaining channels. Each channel is separated by 120 Hertz in any given data state, while the data states, MARK and SPACE, on any one channel are separated by 60 Hertz.

TABLE 1

| CHANNEL | BIT | MARK FREQUENCY $f_m$ | SPACE FREQUENCY $f_s$ |
| --- | --- | --- | --- |
| No. 1 | $S_1$ | 390 Hz | 450 Hz |
| No. 2 | $D_1$ | 510 | 570 |
| No. 3 | $D_2$ | 630 | 690 |
| No. 4 | $D_3$ | 750 | 810 |
| No. 5 | $D_4$ | 870 | 930 |
| No. 6 | $D_5$ | 990 | 1050 |
| No. 7 | $D_6$ | 1110 | 1170 |
| No. 8 | $D_7$ | 1230 | 1290 |
| No. 9 | $S_2$ | 1350 | 1410 |
| No. 10 | $D_8$ | 1470 | 1530 |
| No. 11 | $D_9$ | 1590 | 1650 |
| No. 12 | $D_{10}$ | 1710 | 1770 |
| No. 13 | $D_{11}$ | 1830 | 1890 |
| No. 14 | $D_{12}$ | 1950 | 2010 |
| No. 15 | $D_{13}$ | 2070 | 2130 |
| No. 16 | $D_{14}$ | 2190 | 2250 |
| No. 17 | $D_{15}$ | 2310 | 2370 |
| No. 18 | $D_{16}$ | 2430 | 2490 |

Figure 3:
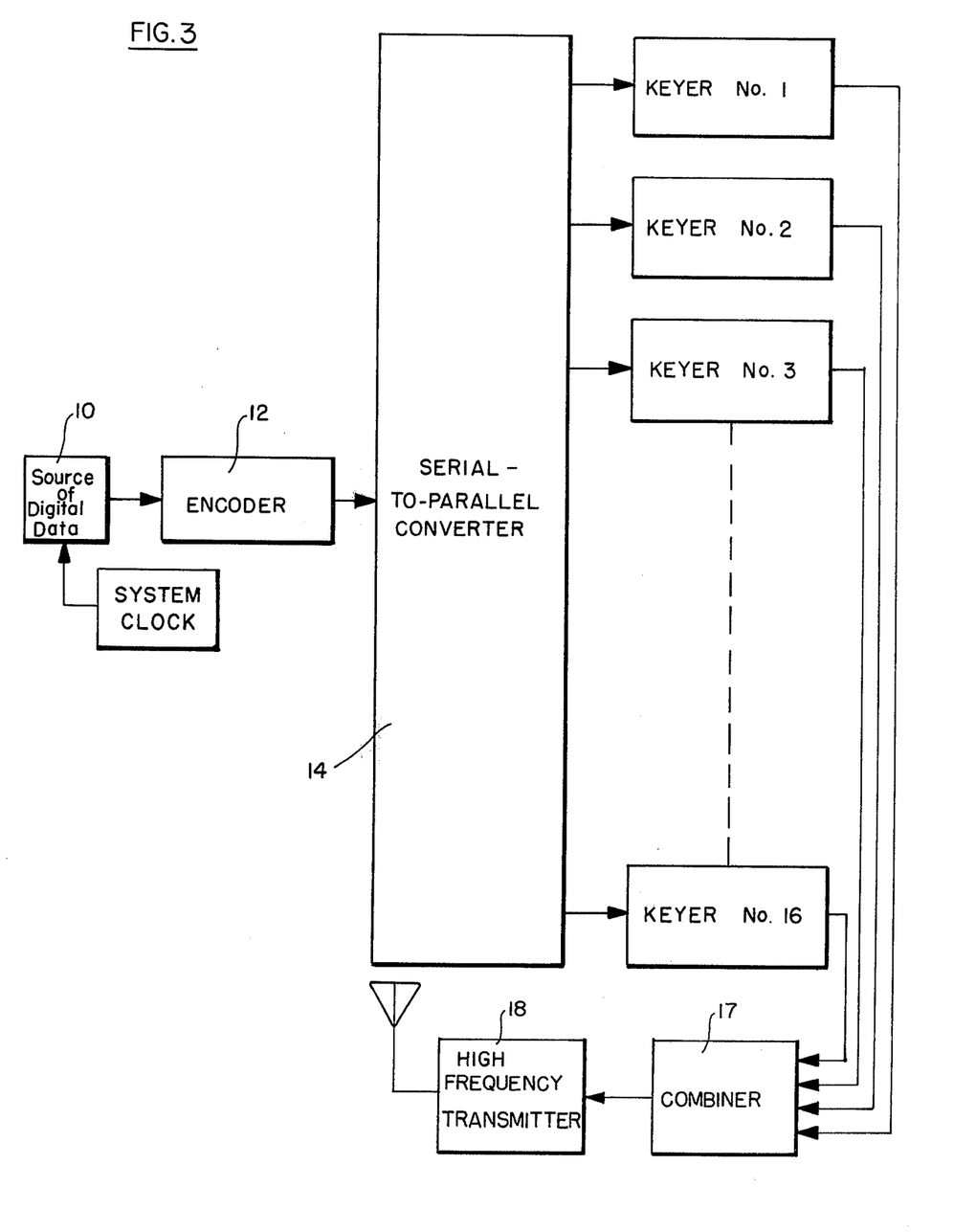
FIG. 3 is a block diagram of a digital data transmitter operating and encoded with an error correcting code.
Figure 4:
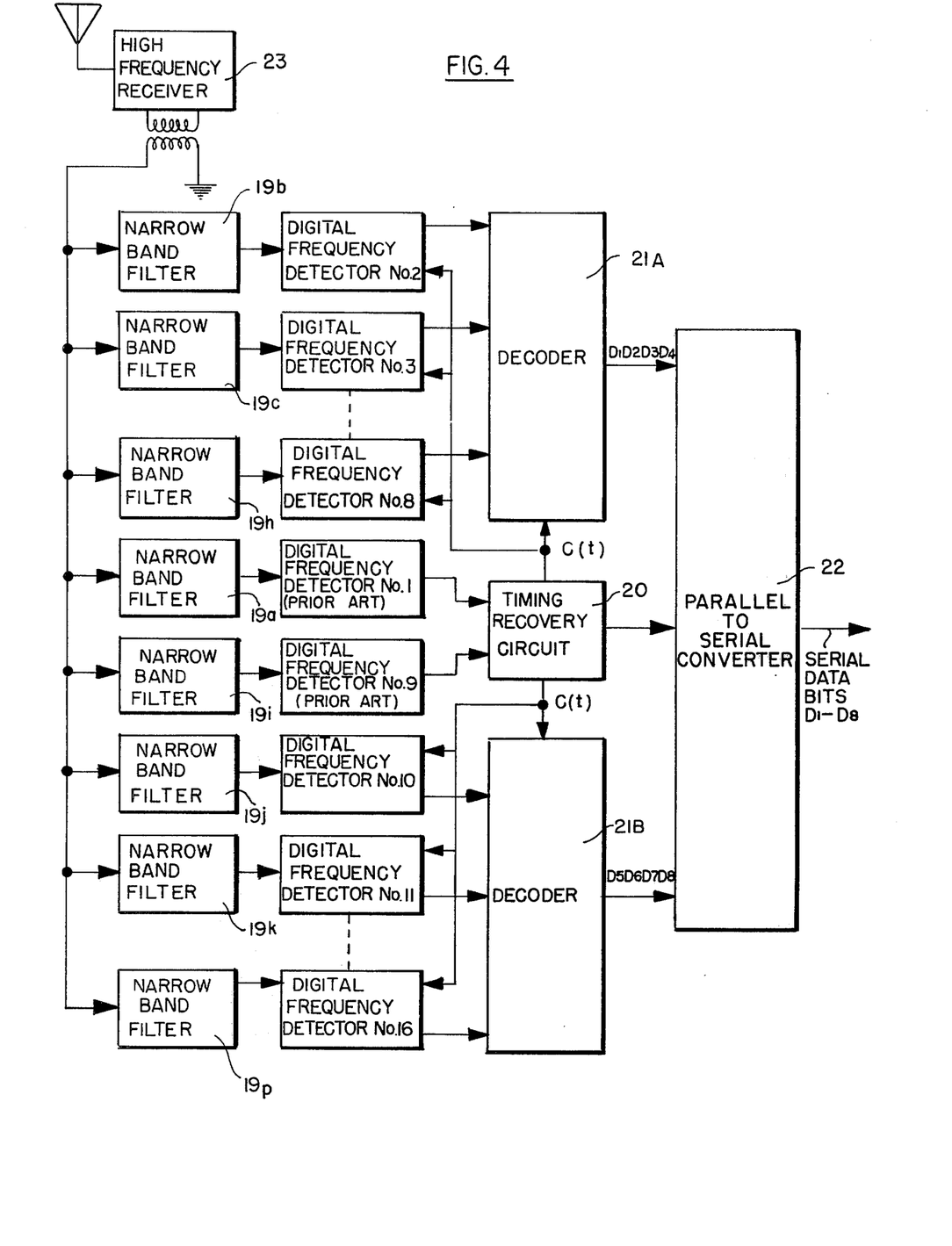
FIG. 4 is a block diagram of a digital data receiver operating to receive data from the transmitter of FIG. 3.

FIGS. 3 and 4 illustrate a data link system in which the system designer took additional steps to avoid noise degradation. FIG. 3 indicates the transmitter end of the system, FIG. 4 the receiver end. Components which would be found in the more conventional system of FIGS. 1 and 2 include channel combiner 17 and transmitter 18, receiver 23 and filters 19. These were not illustrated earlier.

The significant difference in the two systems (FIGS. 1 and 2 vs. FIGS. 3 and 4) is the addition of an encoder 12 at the transmitter and decoders 21 at the receiver. Encoders and decoders are used so that errors in the digital data transferred from one location to another may be detected and corrected. Digital data are transmitted in the form of pulses having one of two logic levels. These levels are usually referred to as "1" and "0". Each pulse is known as a bit. Bits are grouped, analogous to the dots and dashes of Morse Code, to convey information. Such a group is denoted a data frame.

The simplest error detecting code is one which adds one bit to each data frame. The logic level, "1" or "0", of the extra bit is chosen such that the total number of logic "1" bits in the field is odd or even. The extra bit is called a parity bit. Odd parity, in which each frame always contains an odd number of bits at logic level "1" is preferred since it insures that there is at least one "1" in each data frame.

However the addition of only one parity bit allows only the detection of a single error and makes no provision for correcting the error when it is discovered. A single parity bit does not carry enough redundant information to detect and correct multiple errors. It is possible however to add enough redundant bits to the data frame such that errors will not only be detected, but corrected as well.

A data frame containing an error-correcting field of redundant information is known generally as a Hamming code. One of the most powerful and versatile error correcting codes is the Bose-Chauldhuri-Hacquenghem or BCH code. A possible frequency channel allocation for a data link system using an error correcting code might take the form of that given in Table 2.

TABLE 2

| CHANNEL | BIT | MARK FREQUENCY $f_m$ | SPACE FREQUENCY $f_s$ |
|---|---|---|---|
| No. 1 | $S_1$ | 390 Hz | 450 Hz |
| No. 2 | $D_1$ | 510 | 570 |
| No. 3 | $D_2$ | 630 | 690 |
| No. 4 | $D_3$ | 750 | 810 |
| No. 5 | $D_4$ | 870 | 930 |
| No. 6 | $P_1$ | 990 | 1050 |
| No. 7 | $P_2$ | 1110 | 1170 |
| No. 8 | $P_3$ | 1230 | 1290 |
| No. 9 | $S_2$ | 1350 | 1410 |
| No. 10 | $D_5$ | 1470 | 1530 |
| No. 11 | $D_6$ | 1590 | 1650 |
| No. 12 | $D_7$ | 1710 | 1770 |
| No. 13 | $D_8$ | 1830 | 1890 |
| No. 14 | $P_4$ | 1950 | 2010 |
| No. 15 | $P_5$ | 2070 | 2130 |
| No. 16 | $P_6$ | 2190 | 2250 |

As in the more conventional system which does not use an error correction code, the channels are separated by 120 Hertz in any given data state and each channel displays a 30 Hertz separation between data states in that channel. Also, as before, channels No. 1 and No. 9 have been designated as synchronization channels.

Channels No. 2 – No. 5 are data channels while channels No. 6 – No. 8 are parity channels over which redundant information, derived from the data on channels No. 2 – No. 5, are transmitted as parity bits. Thus, in a seven bit data frame transmitted over channels No. 2 – No. 8, there would exist a field of four data bits and three error correcting bits. This may be referred to as a (7, 4) BCH code. Using such a code it is possible to devise a system which will pass correct data even if one of the four data channels is completely obliterated by noise. Data channels No. 10 – No. 13, and parity channels No. 14 – No. 16, are similarly constituted so that, in the system set out, it is possible that noise might completely wipe out one of channels No. 2 – No. 8 and one of channels No. 10 – No. 16 yet the system will still recover the data as originally transmitted.

Because redundant data must be transmitted in any error correcting scheme, less overall information is conveyed per channel when compared with non-encoded systems. The frequency allocations of Tables 1 and 2 have been established to suggest to the system designer that one system might function as both an encoded and a non-encoded data link. Thus, when there is little noise present, more efficient use of the system may be made without redundant data transmissions. This is especially true when the system is enhanced by use of the invention herein. When noise levels become troublesome, the system may be switched to an encoded, error correcting system.

Error correcting and non error correcting systems have been outlined above to establish the environment in which the present invention may be utilized. The use of either system to communicate information in the presence of noise will be improved if the teachings herein are adhered to.

The invention enhances system performance in the presence of noise. The method utilizes, for example, two synchronization channels employing the better one to synchronize the receiver to the transmitter. The method teaches the accumulation of the results of a plurality of data-state determining measurements and the utilization of the accumulated measurements made during a baud interval to resolve the received mark/space frequency signal into a corresponding mark/space data-state signal. Apparatus to practice the method is described below. The apparatus includes a timing recovery circuit for synchronization-channel selection and a digital frequency detector capable of extracting information from a data signal in the presence of noise having the same frequency as the data signal and up to 86.6% of the amplitude of the data signal.

Timing Recovery Circuit

As already indicated, the method used to synchronize the system requires the transmission of redundant synchronization signals. Assume for purposes of exposition that the system operates at a baud of 75. This means that there will be 75 discrete conditions or signal events per second. Let the synchronization signal consist of a train of alternate MARK/SPACE signals. At the receiver a periodic waveform having a fundamental frequency of about 37.5 Hertz will result after detection of the received MARK/SPACE signal train. The actual frequency may vary slightly due to noise effects.

Figure 5:
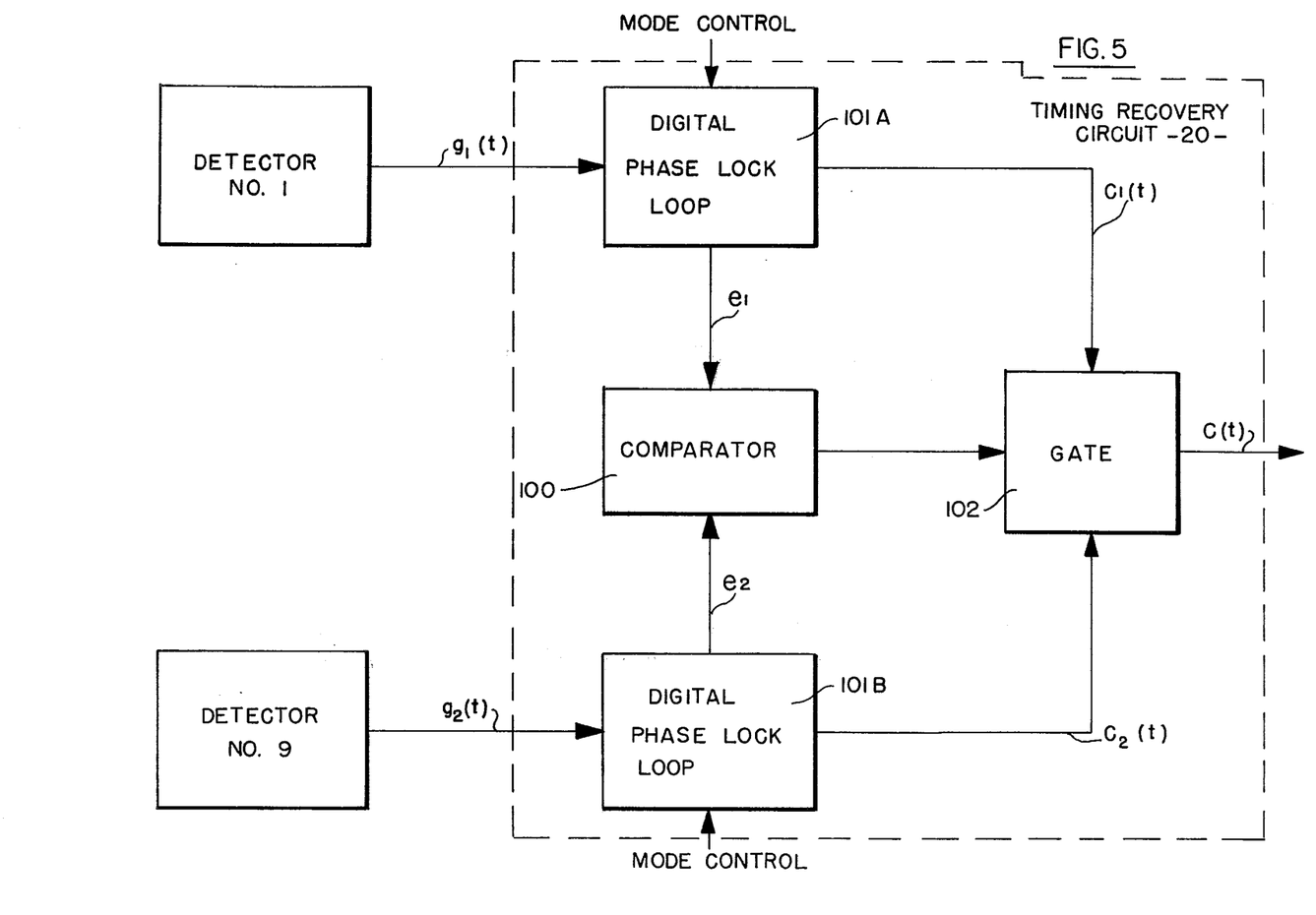
FIG. 5 is a block diagram of a timing recovery circuit used in the receiver, and which generates the clock signal of FIG. 6.

FIG. 5 illustrates timing recovery circuit 20. The sync signal on channel No. 1, when detected, presents periodic waveform $g_1(t)$ to digital phase lock top 101A. Sync signal channel No. 9's detector presents periodic waveform $g_2(t)$ to digital phase lock loop 101B. Each phase lock loop circuit 101 has a relatively long time constant in order to remove phase jitter introduced by noise in the communication channel.

Each phase lock loop has two outputs. One output is a periodic waveform, $C_1(t)$ or $C_2(t)$, which may be suitable for use as a clock signal. The other output, $e_1$ or $e_2$, represents the magnitude of the phase jitter of the waveform, $g_1(t)$ or $g_2(t)$, which is input to the loop.

Figure 6:
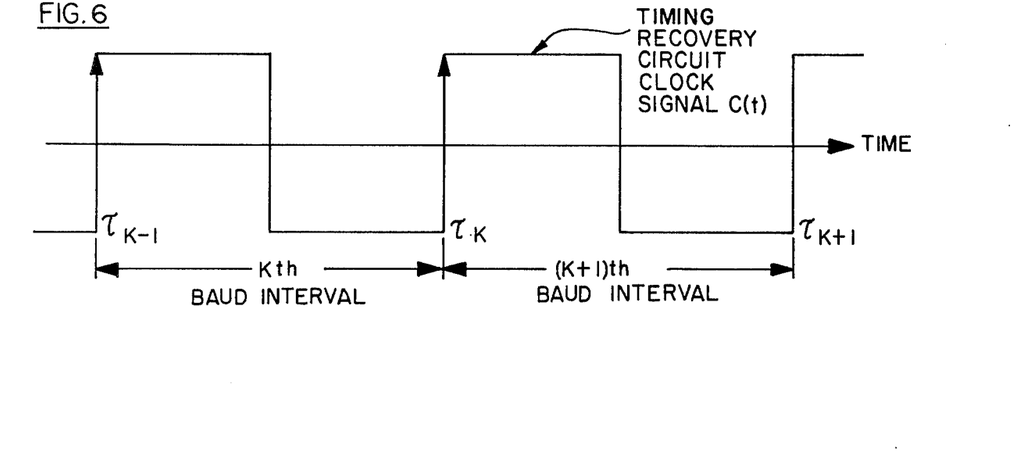
FIG. 6 is a representation of the waveform of a clock signal generated by a timing recovery circuit in the data link receiver.

Phase jitter signals, $e_1$ and $e_2$, are fed to comparator 100 which compares them, and selects the signal representing the least phase jitter. If signal $e_1$ is less than $e_2$, comparator 100 causes gate 102 to pass signal $C_1(t)$ for use as clock signal $C(t)$ throughout the receiver. Should $e_2$ be less than $e_1$, the clock signal $C(t)$ will derive from signal $C_2(t)$ in similar fashion. A representative waveform of clock signal $C(t)$ is shown in FIG. 6.

The method and apparatus disclosed will allow continuous, synchronized operation of the data link system even though either one of the synchronization channels is obliterated by noise.

Digital Frequency Detector

Figure 7:
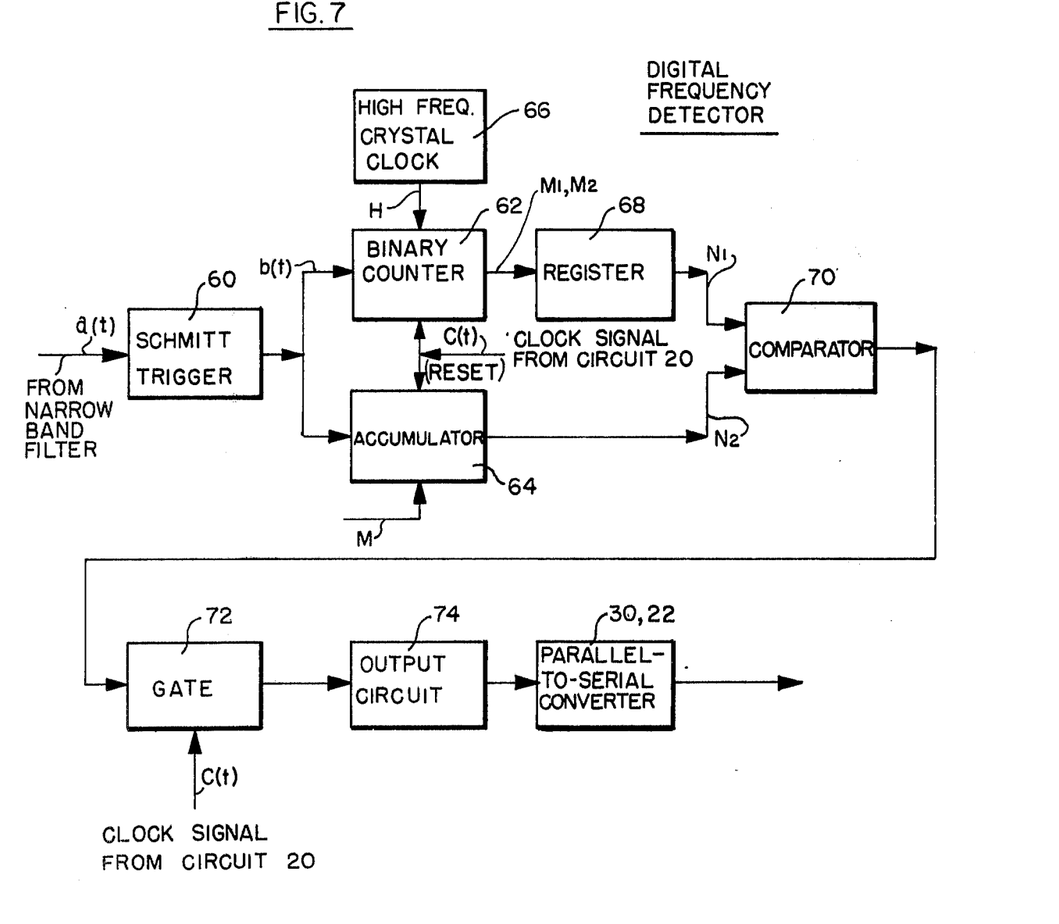
FIG. 7 is a block diagram of a digital frequency detector constructed in accordance with the invention.
Figure 8:
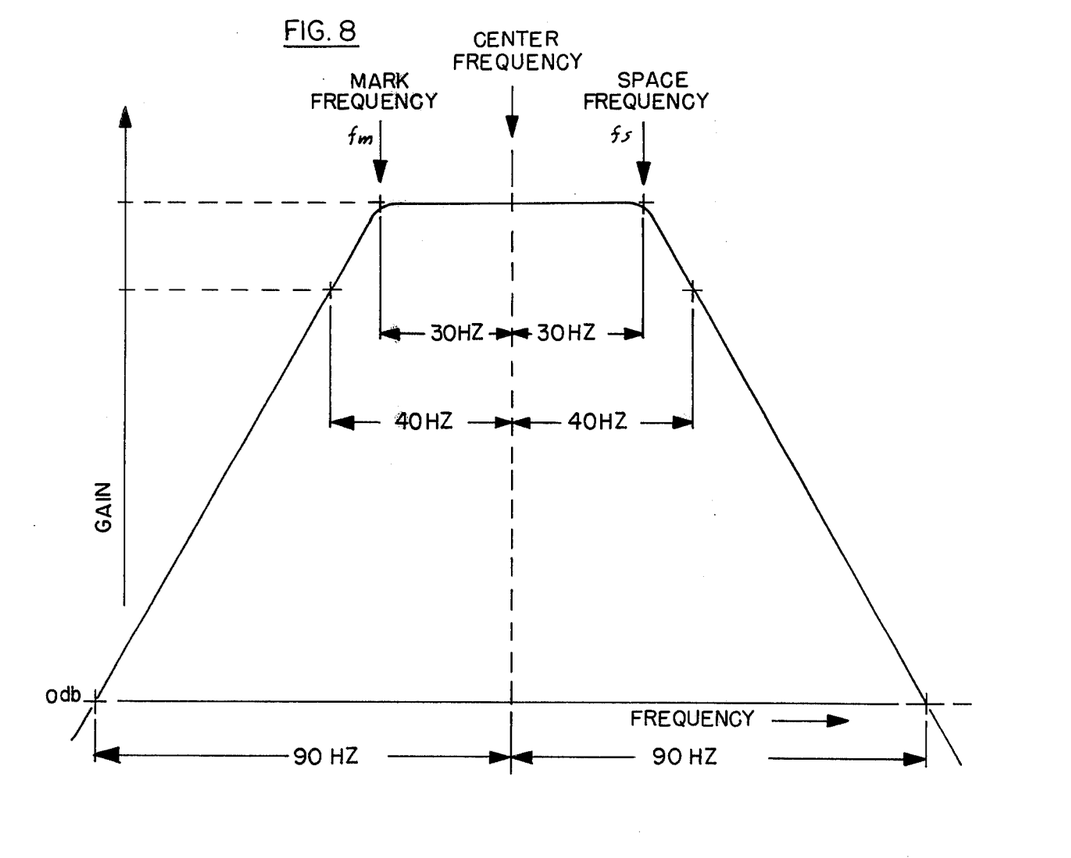
FIG. 8 is a representation of a typical gain versus frequency characteristic curve of a narrow band filter, the filter being used in conjunction with each digital frequency channel in the receiver of FIGS. 2 and 4.

The digital frequency detector of the invention is disclosed in block form in FIG. 7. Good practice dictates that the received signal be passed through a bandpass filter so that noise components outside the bandwidth transmitted are removed. A typical response characteristic for such a filter is shown in FIG. 8.

Figure 9:
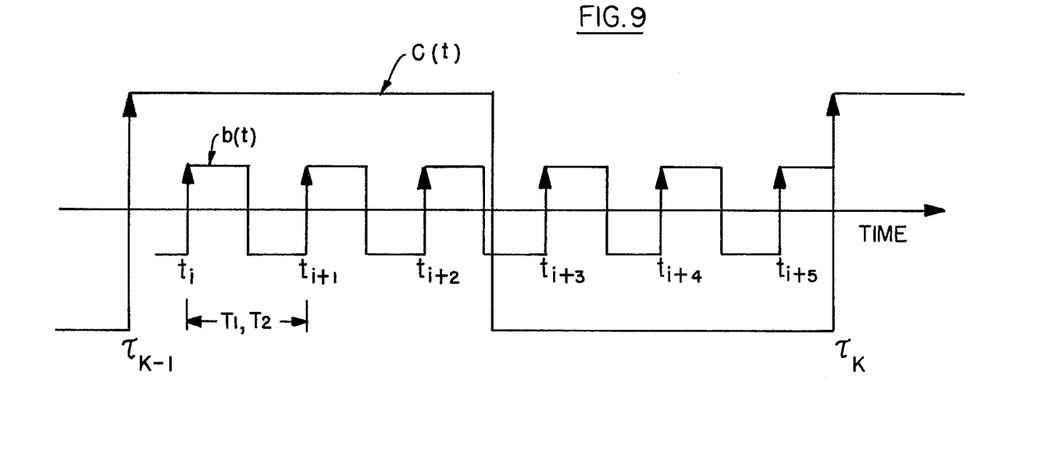
FIG. 9 is a waveform illustrating the operation of the digital frequency detector of FIG. 7.

After filtering the FSK signal is converted into a rectangular wave such as wavetrain b(t) of FIG. 9. This operation eliminates amplitude distortions and provides a sharply defined zero crossing. The time ($T_1$ or $T_2$) between positive going zero crossings of wavetrain b(t) represents the period of a MARK or SPACE frequency signal. The period of b(t), that is the duration of each cycle of the wavetrain, will, of course, vary as the FSK signal varies between MARK and SPACE frequency data states. If the frequency allocations of Tables 1 and 2 are used, a mark frequency cycle will have a longer duration than a space frequency cycle since the SPACE signal is transmitted at a higher frequency in any given channel.

In the detector of FIG. 7 a Schmitt trigger 60, or other suitable device, processes the incoming signal to convert it to waveform b(t). The positive going zero crossings of b(t) are then used to start counter 62 counting and to cause counter 62 to dump its count, without resetting, to register 68. Counter 62 counts the output, H, of high frequency crystal clock 66.

Since counter 62 is not reset when its count is dumped to register 68, the count stored in register 68 will be that count accumulated by counter 62 when it was last commanded by a positive going zero crossing of b(t) to dump its count. In this way it is seen that counter 62 counts the number of clock pulses which occur during each cycle of incoming signal b(t). It accumulates its count over a number of cycles, transferring the count accumulated at the end of each cycle of b(t) to register 68, from where it is outputted to a first input of comparator 70.

The positive going zero crossing b(t) is also utilized to control accumulator 64, which has a reference value M as its input. Upon application of the b(t) signal, accumulator 64 outputs its stored value to a second input of comparator 70, and then increments its stored value by the value of M at its input. Thus, at the end of the first cycle of wavetrain b(t) accumulator 64 will output a value of M; after two cycles it will output 2M; after 3 cycles, 3M, etc.

Comparator 70 compares the outputs of Register 68 and accumulator 64 and, on the basis of the comparison, establishes the data state, either MARK or SPACE, of the received signal. To synchronize the operation of the detector, clock signal C(t), FIG. 9, is applied to reset both counter 62 and accumulator 64 as C(t) goes positive through a zero crossing. In this manner counter 62 and accumulator 64 are set to zero at the beginning of each baud interval, $\tau$, corresponding to a period of clock signal C(t). Thus the counts accumulated by counter 62 and accumulator 64 are only those counts made within a baud interval. Clock signal C(t) may derive from Timing Recovery circuit 20 or may originate locally if a different synchronization technique is preferred.

Further discussion of the signals fed to comparator 70 is in order if a full understanding of the digital frequency detector is to be had. As already noted, b(t) is a periodic waveform having a period whose duration is determined by the frequency of the mark/space signal received. If a mark frequency cycle has a longer duration than a space frequency cycle, then counter 62 will count a higher number of clock pulses, H, during a mark than during a space frequency cycle. Therefore, within one cycle the number of pulses counted, say $M_1$ for a mark frequency cycle and $M_2$ for a space cycle, is itself indicative of the data state of the mark/space frequency signal received. However, noise may have so modified the signal transmitted that an erroneous data-state determination could derive from the measurement of only one cycle of the received signal. Therefore, in the invention herein disclosed, data state determining measurements are made over a plurality of cycles of the received signal and the measurement results accumulated over a baud interval before resolving the received frequency signal into a corresponding data state signal.

A reference, M, is provided to aid in establishing the data state of the signal received. This reference is chosen so as to have a value $M_2 < M < M_1$. Thus, M has a value representative of the number of pulses that would be counted if the received frequency had a period whose duration was between that of the duration of a space frequency cycle and the duration of a mark frequency cycle. A convenient, reliable reference value to use is $$M = (M_1 = M_2)/2$$

Since M, $M_1$ and $M_2$ are all representative of the number of pulses which would be counted during one cycle of a frequency signal, and since it is desirable to accumulate the number of pulses counted over a plurality of cycles of the received frequency signal, the total number of pulse counts so accumulated may be designated as follows:

$N_1$ = The number of pulse counts accumulated over a plurality of cycles of the frequency signal actually received.

$N_2$ = The number of pulse counts which would have accumulated over the same number of cycles of the assumed reference frequency signal.

Counts $N_1$ from register 68 and $N_2$ from accumulator 64 are fed to respective inputs of comparator 70 where a data state determination is made according to the following relationship.

$$N_1 > N_2 = \text{MARK}$$

$$N_1 < N_2 = \text{SPACE}$$

The output of comparator 70 is gated by gate 72 so that only the mark/space data state decision made from the measurements finally accumulated during the baud interval are passed. To this end, gate 72 is opened only at the positive going zero crossings of clock signal C(t).

As noted earlier, clock signal C(t) is applied to counter 62 and accumulator 64 as a reset pulse and to gate 72 to activate the gate to pass the comparator's final determination of the data state of the received frequency signal. Use of clock signal C(t) as disclosed assures that data state determining measurements are made only during a baud interval, i.e., only during a period at which a discrete mark/space condition exists, and further, that the final data state determination, based on accumulated measurements, is made at and coincident with the end of a baud interval, assuring that good system synchronization is maintained while reliable data state determinations are made.

The signal presented to the digital frequency detector after traversing the narrow band filter 19 may be generally represented as follows:

$$u(t) = \cos 2\pi f_u t + a_1 \cos (2\pi f_1 t + H_1)$$

The information signal is transmitted at frequency $f_u$ while $f_1$ represents the frequency of an interfering continuous wave (c.w.) signal. The peak amplitude of the interfering signal at $f_1$ is represented by coefficient $a_1$. The digital frequency detector disclosed will correctly resolve the received information frequency signal into its corresponding data state if $a_1$ has a value less than 0.866, for any and all values of $f_1$ and $H_1$. This means that the disclosed digital frequency detector will correctly resolve the data state of the received signal even though there is an interference signal at the same frequency having an amplitude as great as 86.6% that of the received information signal. Thus, excellent protection against c.w. interference is provided.

A general description of FSK digital data link systems has been given. Systems encoded with error correcting redundant parity bits and those not so encoded have been set forth as background and to provide some familiarity with the environment in which the instant invention is utilized. Practice of the method herein disclosed will greatly enhance the ability of a FSK data link system to correctly recover information transmitted through noise.

The synchronizing scheme proposed, using two or more different frequency channels, limits the use of the technique to systems with multi-channel capability. However, the detection scheme disclosed may be used advantageously with single channel systems as well as those which transmit and receive over a plurality of different frequency channels.

Apparatus for both a timing recovery circuit to synchronize the system and a digital frequency detector circuit have been set forth to assist those of ordinary skill in the art to understand and practice the inventive method of reducing a system's susceptibility to noise.

It will be obvious to those skilled in the art that various changes and modifications may be made without departing from the invention. It is therefore intended to cover herein all such changes and modifications as fall within the true spirit and scope of the invention.

What is claimed is:

1. A digital frequency detector for demodulating a received mark/space frequency-shift digital signal including:
    a counter;
    a first clock signal generator coupled to the counter for introducing a first clock signal to the counter to cause the counter to count at a relatively high rate compared with the frequency of the received mark/space signal;
    a register coupled to the output of the counter;
    first means for introducing the received mark/space signal to the counter to cause the contents of the counter to be transferred to the register at predetermined intervals depending upon the frequency of the received signal;
    an accumulator;
    second means for introducing a reference value into the accumulator during each of the aforesaid predetermined intervals;
    a comparator coupled to the outputs of the register and of the accumulator for comparing the contents of the counter with contents of the accumulator at the end of the aforesaid intervals;
    a gate circuit coupled to the output of the comparator; and
    third means for introducing a second clock signal of a frequency low compared with the frequency of the first clock signal to the counter, to the accumulator, and to the gate circuit, to reset the counter and accumulator at the beginning of each cycle of the second clock signal and for enabling the gate circuit at the end of each cycle of the second clock signal to pass the output from the comparator.

2. The combination defined in claim 1 in which said first means causes the contents of the counter to be transferred to the register at the end of each cycle of the received signal, and in which said second means introduces the reference value into the accumulator during each cycle of the received signal.

3. The combination defined in claim 1, and which includes a trigger circuit included in said first means for squaring the mark/space signal introduced to the counter.

4. In a frequency-shift digital data link in which mark/space digital data are transmitted over a plurality of different mark/space frequency channels to a receiver, a digital frequency detector for each receiver channel comprising:
    synchronizing means to provide a clock signal having a period equal to a baud interval during which a discrete mark/space frequency signal is received;
    means for measuring the duration of a plurality of cycles of the received frequency and accumulating all measurements made within a baud interval as determined by said clock signal;
    means for resolving said accumulated measurement into a corresponding mark/space data state; and
    enabling means to output the data state so resolved, whereby the accumulated measurement made in the interval during which a discrete mark/space frequency signal is received is utilized in resolving the received signal into a corresponding mark/space data state, thereby reducing overall system susceptability to interference signals.

5. The digital frequency detector of claim 4 wherein the means for measuring the duration of a plurality of cycles of the received frequency and accumulating such measurement comprises:
    a first source of pulses to be counted during a plurality of repetition periods of the received mark/space signal said pulses denoted herein as "high frequency clock pulses";
    a counter for counting said high frequency clock pulses, the accumulated output of said counter being dumped to storage means upon command;

storage means to store the high frequency clock count accumulated by said counter; and a second source of pulses derived from and having the same repetition rate as said received mark/space frequency signals, said pulses being utilized to provide commands to dump the output of said counter to said storage means whereby the number of high frequency clock pulses counted each measured repetition period of said mark/space frequency signal are accumulated as a sum total of all such counts in said storage means.

6. The digital frequency detector of claim 4 wherein the means for resolving said accumulated measurement into a corresponding data state comprises:

a comparison means wherein said accumulated measurement is compared to a reference count which reference is that count which would have accumulated during the same measurement interval had the received signal frequency a period between the period of a MARK and a SPACE signal, wherein the resolution of the received signal into a corresponding data state is determined by the manner in which the actual accumulated measurement differs from that of the reference count.

7. The digital frequency detector of claim 4 wherein the synchronizing means to provide a clock signal having a period equal to a baud interval during which a discrete mark/space frequency signal is received, comprises:

a system clock at the transmitter end of the data link to which all data transmissions are synchronized;

means to transmit, on redundant channels, synchronizing signals derived from said system clock; and a timing recovery circuit at the receiver end of said data link to pass the signal least degraded by interference as a clock signal to said digital frequency detector.

8. The synchronizing means of claim 7 wherein said timing recovery circuit comprises:

a gate controllable to select the signal least degraded by interference and pass it on as a clock signal to said digital frequency detector;

a phase lock loop for each redundant synchronization channel detected at the receiver and providing a synchronizing signal to an input of said gate and also providing a signal whose magnitude is related to the degree of phase jitter experienced by the synchronizing signal in the channel; and a comparator for comparing the magnitudes of said phase-jitter-related signals from each synchronization channel and controlling said gate so that the channel having the least phase jitter is selected to be output to the digital frequency detector as a clock signal.

9. In a frequency-shift digital data link in which mark/space digital data are transmitted over a plurality of different mark/space frequency channels to a receiver, a method for reducing overall system susceptability to interference signals, comprising the steps of:

a. transmitting redundant synchronization signals over a plurality of frequency channels to increase the probability that at least one such signal is received and processed at the receiver to maintain system synchronization;

b. transmitting mark/space frequency signals to be resolved at the receiver to a corresponding data state signal;

c. processing the received synchronization signals so as to pass the signal least degraded by interference as a clock signal to synchronize the receiver to the transmitter; and d. resolving the received mark/space frequency signal into a corresponding mark/space data state by making a plurality of status determining measurements during each baud interval and accumulating all measurements so made and determining the corresponding data state of the received signal as a result of the accumulation of measurements.

10. The method of claim 9 in which the processing of the received synchronization signals comprises the steps of:

a. passing each synchronization signal detected through a phase lock loop to determine the degree of phase jitter associated therewith; and b. selecting the signal having the least phase jitter and passing this signal on as a clock signal to synchronize the receiver to the transmitter.

11. The method of claim 9 in which the resolution of the received mark/space frequency signal into a corresponding mark/space data state comprises the steps of:

a. measuring during a baud interval the duration of a plurality of cycles of the received signal;

b. accumulating all measurements so made;

c. comparing the accumulated measurement against a reference, which reference has a value between that which would be accumulated for a SPACE frequency signal and that which would be accumulated for a MARK frequency signal; and d. designating the received signal as a MARK or a SPACE depending upon the manner in which said accumulated measurements differ from said reference.

12. The method of claim 9 comprising the further steps of:

a. introducing an error correcting field into each frame of mark/space frequency signals transmitted; and b. processing the resolved data state signal at the receiver so as to detect and correct errors incurred during transmission.

13. A digital frequency detector for use in resolving a mark/space frequency-shift keyed signal into a corresponding mark/space data state signal, comprising:

a first source of pulses to be counted during a plurality of repetition periods of the received mark/space signal, said pulses denoted herein as "high frequency clock pulses";

a counter for counting said high frequency clock pulses, the accumulated output of said counter being dumped to storage means upon command;

storage means to store the high frequency clock count accumulated by said counter;

a second source of pulses derived from and having the same repetition rate as said received mark/space frequency signals, said pulses being utilized to provide commands to dump the output of said counter to said storage means, whereby the number of high frequency clock pulses counted each measured repetition period of said mark/space frequency signal are accumulated as a sum total of all such counts in said storage means;

a comparison means wherein said accumulated measurement is compared to a reference count, which reference is that count which would have accumulated during the same measurement interval had the received signal frequency a period between the period of a MARK and the period of a SPACE signal, wherein the resolution of the received signal into a corresponding data state is determined by the manner in which the actual accumulated measurement differs from that of the reference count; and synchronizing means to synchronize said counting to coincide with the baud interval of the data state signal so resolved.

14. In a frequency-shift digital data link in which mark/space digital data are transmitted over a plurality of different mark/space frequency channels to a receiver, a method for synchronizing the overall data link system, comprising the steps of:

transmitting synchronization signals over a plurality of frequency channels;

receiving said signals and evaluating them to determine which of said signals was least degraded during said transmission; and selecting said synchronization signal least degraded during transmission and passing it on as a clock signal to be used throughout the receiver to synchronize the receiver with the transmitter in said data link system.

15. The method of claim 14 in which the evaluation of received synchronization signals to determine which of said signals was least degraded during transmission comprises the steps of:

comparing the phase jitter of the several received synchronization signals;

selecting the synchronization signal displaying least phase jitter; and passing the selected signal throughout the receiver for use as a clock signal to synchronize the receiver with the transmitter in said data link system.

* * * * *